United States Patent [19]

Santacaterina et al.

[11] Patent Number: 4,779,995
[45] Date of Patent: Oct. 25, 1988

[54] REUSABLE LIQUID CRYSTAL THERMOMETER

[75] Inventors: Luis Santacaterina; George T. Brown, Jr.; Winfried Schuberth, all of Dayton, Ohio

[73] Assignee: American Thermometer Co., Inc., Dayton, Ohio

[21] Appl. No.: 903,702

[22] Filed: Sep. 4, 1986

[51] Int. Cl.$^4$ ............................................. G01K 11/12
[52] U.S. Cl. ................................. 374/162; 374/106; 374/161
[58] Field of Search ..................... 374/161, 162, 106; 128/736; 116/207

[56] References Cited

U.S. PATENT DOCUMENTS

| | | | |
|---|---|---|---|
| 3,243,303 | 3/1966 | Johnson | 374/106 |
| 3,440,882 | 4/1966 | Jones . | |
| 3,597,976 | 8/1971 | Fryar | 374/106 |
| 3,826,141 | 7/1974 | Pickett et al. | 374/162 |
| 3,871,232 | 3/1975 | Pickett et al. | 374/106 |
| 3,878,722 | 4/1975 | Crites | 374/162 |
| 3,951,133 | 4/1976 | Reese | 128/736 |
| 3,955,420 | 5/1976 | Parker . | |
| 3,974,317 | 8/1976 | Sharpless | 374/162 |
| 3,998,098 | 12/1976 | Chilton | 374/106 |
| 4,030,482 | 6/1977 | Navato | 374/162 |
| 4,128,007 | 12/1978 | Ulin | 374/106 |
| 4,140,016 | 2/1979 | Fergason | 374/162 |
| 4,150,572 | 4/1979 | Lindquist | 116/207 |
| 4,232,552 | 11/1980 | Hof et al. | 374/162 |
| 4,248,089 | 2/1981 | Heinmets | 374/162 |

Primary Examiner—William A. Cuchlinski, Jr.
Assistant Examiner—Thomas B. Will
Attorney, Agent, or Firm—Jacox & Meckstroth

[57] ABSTRACT

An elongated body of molded plastics material has an end portion with longitudinally spaced and laterally extending temperature numbers overlying corresponding bands of liquid crystal compositions, and an elongated lens of transparent plastics material covers the numbers and compositions and is sealed to the end portion of the body around the compositions. In one embodiment, the compositions are carried by an aluminum strip or foil which has a center portion spaced within a cavity and opposite edge portions projecting to the outer surface of the body between the lens and the body end portion. In another embodiment, the body end portion has longitudinaly spaced cells or cavities for receiving the liquid crystal compositions in a slurry form, and in a further embodiment, the body is molded of a transparent plastics material and has an end portion which forms a second lens to provide a double-sided thermometer. Another embodiment has superposed or overlaid liquid crystal compositions which respond to different temperatures and form segments of digital temperature numbers.

10 Claims, 1 Drawing Sheet

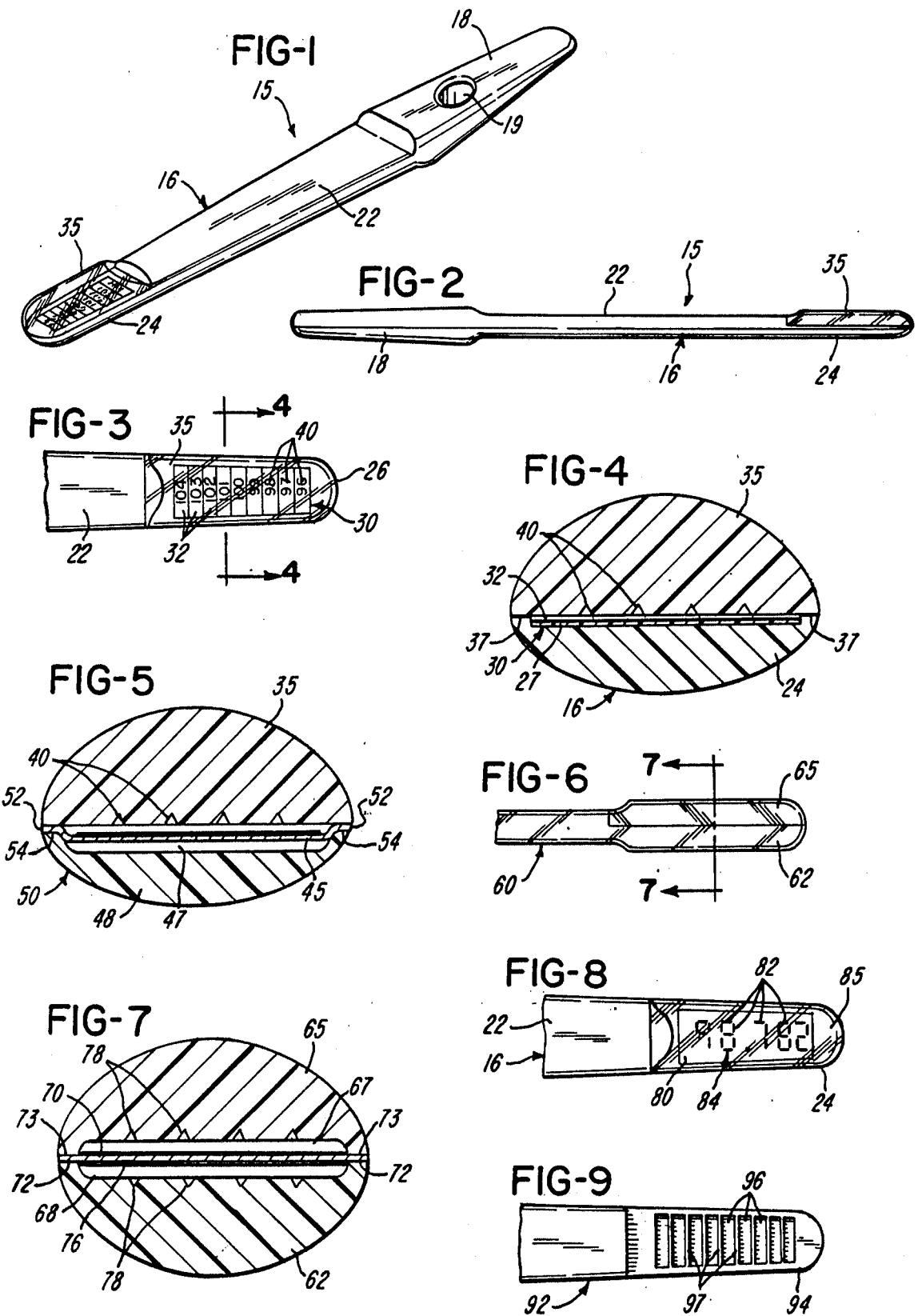

REUSABLE LIQUID CRYSTAL THERMOMETER

BACKGROUND OF THE INVENTION

In the construction of reusable liquid crystal thermometers of the type adapted for measuring and indicating the oral temperature of a person, there have been several thermometers either proposed or constructed. For example, U.S. Pat. No. 3,440,882, No. 3,974,317 and No. 3,955,420 disclose different forms of thermometers or temperature measuring and indicating devices and which utilize cholesteric liquid crystal formulations or compositions. The compositions may or may not be microencapsulated and are effective to change in color or in light refraction in response to a change in temperature.

In such an oral thermometer, it is desirable for the body of the thermometer to be unbreakable, non-toxic and easy to clean and sterilize in addition to being easy and convenient to read and feel comfortable in a person's mouth. It is also highly desirable for the thermometer to be durable so that it is not affected by dropping or shaking or vibraion. However, after analyzing the thermometers disclosed in the above patents, it is apparent that none of the thermometers provide all of these desirable features.

SUMMARY OF THE INVENTION

The present invention is directed to an improved reusable thermometer which is ideally suited for use as an oral thermometer to take a person's body temperature and which provides all of the desirable features and advantages mentioned above. In accordance with the invention, a thermometer is constructed of an elongated body molded of a substantially rigid plastics material and has a slight tapering configuration from a first end gripping portion longitudinally to a second end portion adapted to be inserted into a person's mouth. The second end portion is bonded to an elongated lens of transparent plastics material, and the lens is provided with a series of longitudinally spaced and multiple digit temperature numbers representing a predetermined temperature range.

Directly under the lens, the second end portion of the body carries a corresponding series of laterally extending bands of liquid crystal compositions each having a change in color or light refraction corresponding to one of the temperature numbers. The lens is sealed to the second end portion of the body around the bands of liquid crystal compositions and provides for wide angle viewing and magnification of the temperature numbers and the color changes of the corresponding liquid crystal compositions.

In another embodiment, the longitudinally spaced and laterally extending bands of liquid crystal compositions are carried by a black heat conducting metal foil which is spaced within a sealed air cavity. The foil has edge portions projecting outwardly to the outer surface of the thermometer body to provide for rapid transfer of heat from a person's mouth to the liquid crystal compositions. The thermometer body may also be molded of a clear transparent plastics material and provided with a second end portion which also forms a lens to provide for wide angle viewing of different temperature scales or ranges and corresponding liquid crystal compositions on opposite sides of a support strip confined between the lens portion of the body and the opposing lens bonded to the end portion.

Other features and advantages of the invention will be apparent from the following description, the accompanying drawing and the appended claims.

BRIEF DESCRIPTION OF THE DRAWING

FIG. 1 is a perspective view of a reusable oral thermometer constructed in accordance with the invention;

FIG. 2 is a side elevtional view of the thermometer shown in FIG. 1;

FIG. 3 is an enlarged top view of the insertable end portion of the thermometer shown in FIGS. 1 and 2;

FIG. 4 is an enlarged section taken generally on the line 4—4 of FIG. 3;

FIG. 5 is an enlarged section similar to FIG. 4 and showing a modification of a thermometer constructed in accordance with the invention;

FIG. 6 is an enlarged edge view of the insertable end portion of a double sided thermometer constructed in accordance with the invention;

FIG. 7 is an enlarged section similar to FIG. 4 and taken generally on the line 7—7 of FIG. 6;

FIG. 8 is a view similar to FIG. 3 and showing a further modification of a thermometer constructed in accordance with the invention; and FIG. 9 is a view similar to FIG. 8 and showing another modification of a thermometer constructed in accordance with the invention.

DESCRIPTION OF THE PREFERRED EMBODIMENTS

FIG. 1 illustrates a reusable oral thermometer 15 which comprises a body 16 molded of a rigid thermoplastics material such as nylon. The body 16 includes a tapered first end portion 18 having a hole 19 for hanging the thermometer on a hook or pin or for receiving a cord. The body also has a thinner and tapered intermediate portion 22 and a slightly tapered second end portion 24 having a rounded tip surface 26. The end portion 18 is adapted to be gripped with a person's fingers, and the end portion 24 is adapted to be inserted into a person's mouth under the tongue.

Referring to FIG. 4, the end portion 24 of the body 16 has a rectangular cavity or recess 27 which receives a strip or film 30 having precoated thereon longitudinally spaced bands 32 (FIG. 3) of cholesteric liquid crystal compositions. Each of the liquid crystal compositions is formulated to provide a change in color or light refraction corresponding with a particular temperature number. For example, the series of numbers may range from 96° F. to 104° F. in increments of 1° F., as indicated in FIG. 3.

As shown in FIGS. 2-4, an elongated lens 35 is molded of a clear transparent plastics material and has a peripheral edge portion bonded by a layer of adhesive 37 (FIG. 4) to the end portion 24 of the body 16. The configuration of the lens 35 corresponds to the shape of the end portion 24 and cooperates with the end portion 24 to provide an oval cross-sectional configuration. The elongated lens 35 has a generally flat bottom surface which carries a series of temperature numbers 40 corresponding to the underlying bands 32 of liquid crystal compositions coated on the film 30. As illustrated in FIG. 4, the numbers 40 are engraved within the bottom surface of the lens 35, and the curvature of the lens 35 provides for magnification and wide angle viewing of the numbers 40 and the color changes in the bands 32 of liquid crystal compositions. The numbers 40 may also be printed with a dark ink on the bottom surface of the lens 35 or the engraved numbers may be filled with an ink to provide for more easily reading the laterally extending digital temperature numbers 40 magnified by the lens.

Referring to FIG. 5, a strip 45 of black anodized aluminum foil is suspended within a cavity 47 formed within an end portion 48 of a modified thermometer body 50. The strip 45 is coated with a series of laterally extending bands 32 of liquid crystal compositions in the same manner as the coated strip or film 30, referred to above in connection with FIG. 4. The end portion 48 of the body 50 is covered by the lens 35, and the opposite longitudinal edge portions 52 of the strip 45 extend to the outer surface of the lens 35 and are bonded and sealed by adhesive to both the lens 35 and the lips 54 of the body end portion 48.

As also shown in FIG. 5, the coated strip or foil 45 is positioned within the cavity 47 to provide air spaces both above and below the strip 45 to minmize heat transfer from the strip. However, the exposed outer edge surfaces of the strip 45 provide for rapid conduction of heat from the person's tongue or saliva into the strip 45 for rapidly changing the colors of the liquid crystal compositions to obtain a quick reading. When the end portion 48 of the thermometer body 50 is withdrawn from the mouth, the air spaces on opposite sides of the strip 45 function as a thermal insulator and extend the time for reading the thermometer by delaying the transfer of heat from the liquid crystal compositions and the return of the compositions to their original normal state. Preferably, the aluminum strip 45 has a thickness between 0.0003–0.010 inch. As mentioned above, the temperature numbers 40 engraved in the bottom surface of the lens 35 may be filled with an ink to enhance the reading of the temperature numbers.

Referring to FIGS. 6 and 7 which illustrate another embodiment of the invention, a thermometer body 60 has the same general shape as the thermometer body 16 and 50 but is molded of a clear transparent plastics material and has an enlarged end portion which forms a second lens 62 directly opposing a lens 65 having the same outer configuration as the lens 35. As shown in FIG. 7, the lens 65 has a recess 67 in its bottom surface, and the second lens 62 has a recess 68 within its upper surface. A flat black anodized aluminum foil or strip 70 is positioned within the center of the cavity formed by the recesses 67 and 68 and has its opposite edge portions bonded and sealed to opposing lips 72 and 73 of the lenses 62 and 65, respectively. The strip 70 is coated on both sides with laterally extending bands 76 of liquid crystal compositions in the same manner as the strips 30 and 45 are coated on only one side of the strips.

The top side of the lens 62 and the bottom side of the lens 65 are engraved with a series of temperature numbers 78, with one surface providing a predetermined range, for example, 96° F. to 100° F. in increments of 0.5° F., and the opposite side having temperature numbers ranging from 100.5° F. to 104.5° F. Thus the double sided thermometer embodiment shown in FIGS. 6 and 7 provides for reading a temperature range in smaller increments and therefore with greater accuracy. The double sided coated aluminum foil or strip 70 provides the same advantages as the strip 45 described above. That is, the exposed edge surfaces of the strip 70 provided for a quick transfer of heat from a person's mouth to the strip 70 and to the series of liquid crystal compositions while the air spaces on opposite sides of the strip 70 delay the heat transfer from the strip 70 after the thermometer is removed from the mouth, thereby prolonging the time within which to read the thermometer before the liquid crystal compositions return to their original states.

Another embodiment of a reusable thermometer constructed in accordance with the invention is shown in FIG. 8. In this embodiment, a foil or strip 80 constructed similarly to the strips 30 or 45 is precoated on one side with superposed or overlying liquid crystal compositions forming bar segments 82 of a multiple digit temperature number 84 which extends longitudinal of a lens 85 molded the same as the lens 35 but without the temperature numbers 40. The general concept of superposed or overlaid liquid crystal formulations or compositions to form series of digital temperature numbers, is disclosed in U.S. Pat. No. 4,030,482. As the temperature of the liquid crystal compositions change, the light refractions of the bars or segments 82 change to provide a digital temperature number 84 which corresponds to the temperature of the end portion 24 of the thermometer body 16 and the lens 85.

In a modification illustrated in connection with FIG. 9, a thermometer body 92 has an end portion 94 which is molded with a series of longitudinally spaced cells or cavities 96 separated by thin ribs or partitions 97. The cavities 96 are filled or injected with a series of liquid crystal formulations or compositions in the form of slurries which have a gel-like consistency. The end portion 94 of the thermometer body 92 is covered with a lens 35 (not shown in FIG. 9), and the lens is bonded and sealed to the end portion 94 completely around the cavities 96 and to the top surfaces of the partitions 97. As mentioned above, the lens 35 carries the series of engraved temperature numbers 40 which correspond with the series of liquid crystal slurries injected into the cavities or cells 96.

From the drawing and the above description, it is apparent that a reusable thermometer constructed in accordance with the invention, provides desirable features and advantages. For example, the various modifications of the thermometer are substantially unbreakable, nontoxic and resistant to shaking and vibration. They may be used for measuring the temperature of a person or a liquid and may also be used for stirring the liquid. Each thermometer also provides for wide angle magnified viewing of the temperature numbers through the lenses 35, 62 and 65, and may be easily cleaned and sterilized in alcohol. The relative flat cross-section of the intermediate portion 22 not only prevents rolling of the body 16, but also provides for comfort in a person's mouth. The plastics material may be selected to provide for bending of the body 16, if desired, and the hole 19 provides attaching a support clip. Furthermore, the thermometer may be easily constructed with different temperature ranges, both in Fahrenheit and Celsius, simply by inserting different strips 30 or 45 or 70 and attaching correspondingly different lenses 35 or 65 with different engraved or preprinted temperature numbers. While the lenses 35 and 65 are described above as being attached by adhesive to the underlying end portion of the thermometer body, it is apparent that other means may be used for bonding the lenses to the body portions to hermetically seal the liquid crystal compositions on the strips or within the cells, such as a solvent or ultrasonic welding. In addition, the double sided thermometer described above in connection with FIGS. 6 and 7 provides for an expanded or more accurate temperature readout or display by providing for an expanded series of different liquid crystal compositions on opposite sides of the strip 70.

While the different forms of a reusable thermometer herein described constitute preferred embodiments of the invention, it is to be understood that the invention is not limited to these precise forms of a thermometer, and that changes may be made therein without departing from the scope and spirit of the invention as defined in the appended claims.

The invention having thus been described, the following is claimed:

1. A reusable thermometer adapted for measuring and indicating the temperature of a person, comprising an elongated molded body of substantially rigid plastics material, said body having an elongated first end portion adapted to be gripped with a person's fingers and an elongated second end portion adapted to be inserted into a person's mouth, means forming a series of longitudinally spaced temperature numbers along said second end portion of said body and representing a predetermined temperature range, a corresponding series of liquid crystal compositions coated on a heat conductive strip as laterally extending bands and disposed adjacent corresponding said numbers with each composition having a change in light refraction corresponding to one of the temperature numbers, an elongated lens of transparent plastics material, said lens extending longitudinally over said second end portion of said body and above said series of temperature numbers and corresponding liquid crystal compositions to provide for wide angle viewing and magnification of said series of temperature numbers and corresponding liquid crystal compositions, said strip including a metal foil having opposite longitudinal edge portions confined between said lens and said second end portion of said body, means bonding said lens and said edge portions of said strip to said second end portion of said body to provide a hermetically sealed protection for said compositions and to permit sterilization of said thermometer, and said edge portions of said foil having exposed outer edge surface portions being disposed adjacent the outer surface of said second end portion of said body and adapted to contact the person's tongue to provide for rapid heat transfer from the person's tongue to said liquid crystal compositions through said strip.

2. A thermometer as defined in claim 1 wherein said lens has an inner surface with said multiple digit temperature numbers formed by recesses within said surface.

3. A thermometer as defined in claim 1 wherein said second end portion of said body defines an air cavity adjacent said strip for reducing the rate of heat transfer from said strip after said second end portion of said body and said lens are removed from the person's mouth.

4. A thermometer as defined in claim 3 wherein both of said lens and said second end portion of said body cooperate with said strip to define air cavities on opposite sides of said strip.

5. A thermometer as defined in claim 1 wherein said second end portion of said body comprises a second transparent lens, said strip having opposite sides with said laterally extending bands of liquid crystal compositions, and a series of multiple digit temperature numbers formed by recess within said second end portion of said body.

6. A thermometer as defined in claim 1 wherein each said end portion of said body has a longitudinally tapering configuration with said second end portion and said first end portion tapering in opposite longitudinal directions.

7. A reusable thermometer adapted for measuring and indicating the temperature of a person, comprising an elongated molded body of substantially rigid plastics material, said body having an elongated first end portion adapted to be gripped with a person's fingers and an elongated second end portion adapted to be inserted into a person's mouth, means forming a series of longitudinally spaced temperature numbers along said second end portion of said body and representing a predetermined temperature range, a corresponding series of liquid crystal compositions coated on a heat conductive strip as laterally extending bands and disposed adjacent corresponding said numbers with each composition having a change in light refraction corresponding to one of the temperature numbers, an elongated lens of transparent plastics material and having a longitudinally extending curved outer surface, said lens extending longitudinally over said second end portion of said body and above said series of temperature numbers and corresponding liquid crystal compositions to provide for wide angle viewing and magnification of said series of temperature numbers and corresponding liquid crystal compositions, said strip including a metal foil having opposite longitudinal edge portions confined between said lens and said second end portion of said body, means bonding said lens and said edge portions of said strip to said second end portion of said body to provide a hermetically sealed protection for said compositions and to permit sterilization of said thermometer, said second end portion of said body and said lens forming an oval configuration in lateral cross-section along the length of said lens and said second end portion, and said edge portions of said foil having exposed outer edge surface portions being disposed adjacent the outer surface of said second end portion of said body and adapted to contact the person's tongue to provide for rapid heat transfer from the person's tongue to said liquid crystal compositions through said strip.

8. A thermometer as defined in claim 7 wherein said second end portion of said body defines an air cavity adjacent said strip for reducing the rate of heat transfer from said strip after said second end portion of said body and said lens are removed from the person's mouth.

9. A thermometer as defined in claim 8 wherein both of said lens and said second end portion of said body cooperate with said strip to define air cavities on opposite sides of said strip.

10. A thermometer as defined in claim 7 wherein said second end portion of said body comprises a second transparent lens, said strip having opposite sides with said laterally extending bands of liquid crystal compositions, and a series of multiple digit temperature numbers formed by recesses within said second lens.

* * * * *